United States Patent
Kleine et al.

(10) Patent No.: US 7,023,182 B1
(45) Date of Patent: Apr. 4, 2006

(54) ACTIVATING A PHASE IN A MULTIPHASE DC/DC CONVERTER WITHOUT DISTURBING THE OUTPUT VOLTAGE

(75) Inventors: John S. Kleine, Cary, NC (US); Thomas A. Jochum, Durham, NC (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 11/221,115

(22) Filed: Sep. 6, 2005

Related U.S. Application Data

(60) Provisional application No. 60/624,786, filed on Nov. 3, 2004.

(51) Int. Cl.
  *G05F 1/00* (2006.01)
(52) U.S. Cl. ..................................................... 323/212
(58) Field of Classification Search ................ 323/212, 323/217, 218, 237, 241, 246, 268, 270–275
See application file for complete search history.

(56) References Cited

U.S. PATENT DOCUMENTS

| | | | | |
|---|---|---|---|---|
| 5,889,380 A | * | 3/1999 | Takada et al. ............... | 318/811 |
| 6,108,221 A | * | 8/2000 | Takada et al. ................ | 363/41 |
| 6,414,470 B1 | * | 7/2002 | Liu et al. ...................... | 323/272 |
| 6,707,408 B1 | * | 3/2004 | Guedon et al. ............. | 341/143 |
| 6,912,144 B1 | * | 6/2005 | Clavette ....................... | 363/98 |
| RE38,846 E | * | 10/2005 | Walters et al. .............. | 323/272 |

* cited by examiner

*Primary Examiner*—Matthew V. Nguyen
(74) *Attorney, Agent, or Firm*—Gary R. Stanford

(57) ABSTRACT

A phase activation control system for a multiphase DC/DC converter including an amplifier circuit and enable logic. The converter includes a first phase circuit providing a first PWM signal and has a reduce input for reducing duty cycle of the first PWM signal. The converter further includes a second phase circuit providing a second PWM signal and having an enable input and an increase input for increasing duty cycle of the second PWM signal. The amplifier circuit has an enable input, a current sense input for sensing output current of the converter and an output providing an adjust signal. The adjust signal is provided to the reduce input of the first phase circuit and to the increase input of the second phase circuit. The enable logic receives a phase enable signal and enables the amplifier circuit and the second phase circuit.

20 Claims, 3 Drawing Sheets

ACTIVATING A PHASE IN A MULTIPHASE DC/DC CONVERTER WITHOUT DISTURBING THE OUTPUT VOLTAGE

CROSS-REFERENCE TO RELATED APPLICATIONS

This application claims the benefit of U.S. Provisional Application No. 60/624,786 filed on Nov. 3, 2004, which is herein incorporated by reference for all intents and purposes.

BACKGROUND OF THE INVENTION

1. Field of the Invention

The present invention relates to multiphase DC/DC converters, and more particularly to adding a phase in a multiphase DC/DC converter without disturbing the output voltage.

2. Description of the Related Art

Multiphase DC/DC converters distribute current to a load among multiple phases or channels to provide increased output power and to improve efficiency at high load levels. Many electronic devices include a low-power or reduced power mode to conserve energy or battery power. The multiphase converter becomes less efficient at lower power levels while all phases remain active, so that it is desired to shut down one or more phases during lower power levels. Control logic of the device determines or detects power requirements and asserts a low power signal or the like to initiate a low power state. For example, many microprocessors detect or otherwise determine that less power is needed and that a reduced power mode of operation is advantageous. The user of an electronic device may command that the device be put in low power or standby mode. The control logic and/or microprocessor switches to low power mode if commanded or if less power is needed. To switch to low power mode, one or more phases are shut down or deactivated.

While operating in the low power mode, the control logic (automatically or in response to user input) and/or microprocessor determines that additional power is necessary and initiates the normal or high power state. In response to removal of the low power signal or any other indication that one or more phases are to be turned back on, conventional multiphase DC/DC converters simply turned on the inactive phase(s) without adjusting the remaining one or more phases already active. The sudden activation of one or more phases caused the output voltage to increase, and the feedback loop operative to maintain the output voltage level responded to the increased output voltage by adjusting the current in the remaining active phases to decrease the rising output voltage and bring it back to the target level. At the same time, the current balance loop pulled the current of each of the loops back into equality. The temporary increase in output voltage, however, often had deleterious effects on the system, and reduced overall efficiency. The current feedback loop was (and potentially still is) relatively slow so that the relative current levels were imbalanced for a significant period of time, which further reduced overall efficiency.

It is desired to avoid a significant increase in the output voltage level when adding one or more phases to achieve regular or high power mode and to balance the relative current levels of the phases without the slow current balance loop.

SUMMARY OF THE PRESENT INVENTION

A phase activation control system for a multiphase DC/DC converter according to an embodiment of the present invention includes an amplifier circuit and enable logic. The DC/DC converter includes a first phase circuit providing a first pulse width modulation (PWM) signal and has a reduce input for reducing duty cycle of the first PWM signal. The DC/DC converter further includes a second phase circuit providing a second PWM signal and having an enable input and an increase input for increasing duty cycle of the second PWM signal. The amplifier circuit has an enable input, a current sense input for sensing output current of the multiphase DC/DC converter and an output providing an adjust signal. The adjust signal is provided to the reduce input of the first phase circuit and to the increase input of the second phase circuit. The enable logic has an input receiving a phase enable signal, a first output coupled to the enable input of the amplifier circuit, and a second output for coupling to the enable input of the second phase circuit.

The enable logic receives the phase enable signal and enables the amplifier circuit. The amplifier circuit senses output (or load) current and provides the adjust signal, which decreases the duty cycle of the first PWM signal and increased the duty cycle of the second PWM signal. In this manner, the duty cycle of the phase that is turning on is increased proportional to the output (or load) current, and the duty cycle of the phase that is already on is decreased proportional to the output (or load) current. The total output current of all the phases, including the phase(s) that are turning on, remains relatively constant. Thus, the output voltage does not rise but instead remains relatively stable while the currents are adjusted. Also, the currents end up balanced without using the slow current balance loop.

The enable logic may include a counter having a first input receiving the phase enable signal, a second input for receiving the second PWM signal, and an output provided to the enable input of the amplifier circuit. The counter enables the amplifier circuit for a predetermined number of cycles of the second PWM signal after receiving the phase enable signal. In this manner, the alteration of duty cycle is done for a number of PWM cycles which is needed to properly change the current of each phase. The enable logic may include synchronization logic which has a first input receiving the phase enable signal, a second input for receiving the second PWM signal, and an output provided to the enable input of the second phase circuit. The synchronization logic enables the second phase circuit from a tri-state condition after receiving the phase enable signal.

The increase and reduce inputs may each be capacitive nodes, where the adjust signal is a current signal for modifying the charging level of the capacitive nodes. The first and second phase circuits may include inductive outputs, and the amplifier circuit may include a resistive-capacitive circuit and a transconductance amplifier. The resistive-capacitive circuit senses average current through the inductive outputs and converts into a corresponding sense voltage. The transconductance amplifier has an input coupled to the resistive-capacitive circuit and an output providing the adjust signal.

A multiphase DC/DC converter according to an embodiment of the present invention includes first and second PWM generators, first and second buffers, first and second inductors, synchronization logic and an amplifier circuit. The first PWM generator provides a first PWM signal having a duty cycle that is reduced by an adjust signal. The second PWM generator provides a second PWM signal having a duty cycle that is increased by the adjust signal. The first buffer receives the first PWM signal and provides a corresponding first phase signal to the first output inductor, and the second buffer receives the second PWM signal and provides a corresponding second phase signal to a second output inductor. The output inductors are coupled together at an output node and the second buffer has an enable input. The synchronization logic receives a channel enable signal and the second PWM signal and provides an enable signal to the enable input of the second buffer. The amplifier circuit senses output current and provides the adjust signal indicative thereof in response to the channel enable signal.

The amplifier circuit may be enabled for a predetermined number of cycles after the channel enable signal is provided. The amplifier circuit may include a counter which counts the predetermined number of cycles of the second PWM signal. The amplifier circuit may include a resistive-capacitive circuit and a transconductance amplifier. The resistive-capacitive circuit is coupled to the output inductors for sensing average current and for converting the average current to a sense voltage. The transconductance amplifier has an input coupled to the resistive-capacitive circuit and an output providing the adjust signal as a current signal. In a more specific embodiment, the PWM generators each include a transconductance circuit and a ripple capacitor, where the transconductance amplifier provides the adjust signal to adjust charging current of each the ripple capacitor.

The synchronization logic enables the second buffer synchronous with the second PWM signal. In one embodiment, the synchronization logic enables the second buffer when second PWM signal is high.

A method of activating a phase in a multiphase DC/DC converter according to an embodiment of the present invention is disclosed. The multiphase DC/DC converter includes a first phase circuit providing a first PWM signal and a second phase circuit providing a second PWM signal and that is selectively enabled. The method includes receiving a phase enable signal and enabling operation of the second phase circuit, sensing output current of the multiphase DC/DC converter, converting sensed output current to an adjust signal, and reducing duty cycle of the first PWM signal while increasing duty cycle of the second PWM signal based on the adjust signal.

The multiphase DC/DC converter may include a buffer which converts the second PWM signal to a second phase signal, where enabling operation of the second phase circuit includes enabling the buffer. In one configuration, the buffer is in a tri-state condition when disabled. In this case, the enabling operation of the second phase circuit may include synchronizing activation of the second phase signal with the second PWM signal. The method may include counting cycles of the second phase upon receiving the phase enable signal, where reducing the duty cycle of a first phase while increasing the duty cycle of a second phase occurs for a predetermined number of cycles of the second phase. The method may include detecting an average current through output inductors of the first and second phases and converting average current to a sense voltage. And the method may include converting the sense voltage to an adjust current.

The method may include alternately charging and discharging, by each of the first and second phases, a corresponding one of first and second ripple capacitors, and increasing charging of the first ripple capacitor and decreasing charging of the second ripple capacitor based on the adjust current. The multiphase DC/DC converter may convert an input voltage to a smaller output voltage. In this case, the alternately charging and discharging may include continuously discharging the first and second ripple capacitors based on the output voltage, and charging the first and second ripple capacitors based on the input voltage while a corresponding PWM signal is high.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
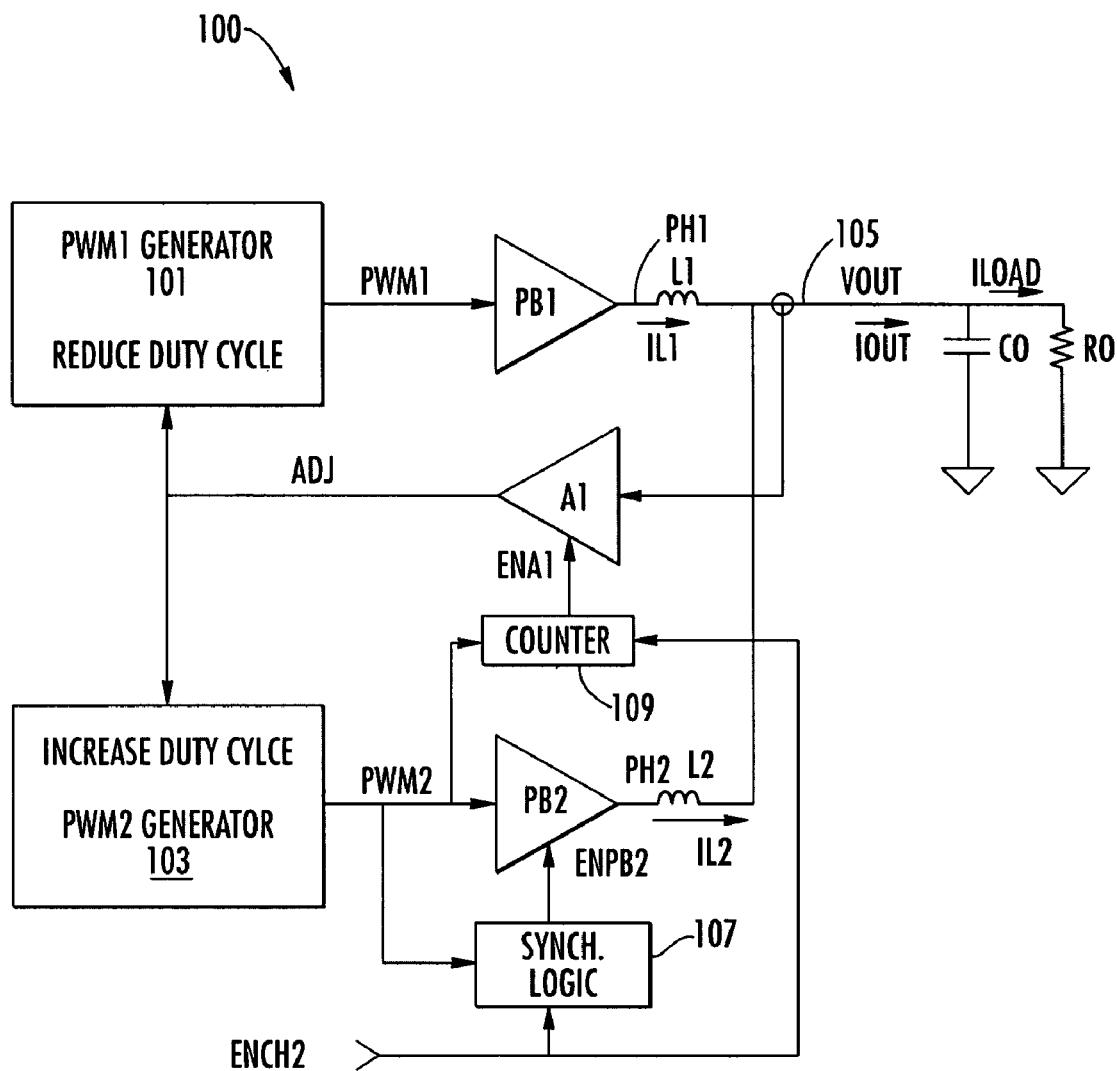
FIG. 1 is a schematic and block diagram of a multiphase DC/DC converter including a phase activation control system implemented according to an exemplary embodiment of the present invention.

FIG. 1 is a simplified schematic diagram of a multiphase DC/DC converter 100 including a phase activation control system implemented according to an exemplary embodiment of the present invention. The multiphase DC/DC converter 100 includes a PWM 1 generator 101 asserting a first pulse-width modulation (PWM) signal PWM 1 and a PWM2 generator 103 asserting a second PWM signal PWM2. The PWM1 signal is provided to the input of a first high power buffer PB1 and the PWM2 signal is provided to the input of a second high power buffer PB2. The output of PB1 provides a phase signal PH1 and is coupled to one end of a first output inductor L1 and the output of PB2 provides a phase signal PH2 and is coupled to one end of a second output inductor L2. The other ends of the output inductors L1 and L2 are coupled together at an output node 105 developing an output voltage VOUT. Node 105 is coupled to one end of an output capacitor C0 and to one end of an output load R0 (shown as a resistor). The other ends of the capacitor C0 and load R0 are coupled to ground. The PH1 signal output from buffer PB1 is a power-amplified version of the PWM1 signal and the PH2 signal is a power-amplified version of the PWM2 signal when the buffer PB2 is enabled. When not enabled, the output of PB2 is tri-stated. The buffer PB2 may also have a diode-emulation mode of operation, which is not discussed further herein as not necessary for a full understanding of the present invention.

The current through the inductors L1 and L2 are shown as IL1 and IL2, respectively, which combines to form an output current IOUT into C0 and R0. The current through the load R0 is shown as ILOAD. Although not explicitly shown, a feedback circuit is included to detect the output voltage VOUT and/or other output parameters or values and to provide the detected output values back to the PWM generators 101 and 103 for purposes of control. The multiphase DC/DC converter 100 is illustrated as including two phases or channels. It is understood, however, that the present invention applies to any number of phases or channels and is not limited to two-phase applications.

An amplifier A1 has an input coupled in a manner (e.g., current sensor or the like) to sense the output current IOUT and has an output providing an adjust signal ADJ to a ReduceDutyCycle input of the PWM1 generator 101 and to an IncreaseDutyCycle input of the PWM2 generator 103. A channel 2 digital or binary enable signal ENCH2 is provided to an input of synchronization logic 107 and to an input of a counter 109. The PWM2 signal is provided to another input of the counter 109 and to another input of synchronization logic 107. The counter 109 provides an enable signal ENA1 to an enable input of the amplifier A1. The synchronization logic 107 provides an enable signal ENPB2 to an enable input of the buffer PB2. The PWM1 and PWM2 signals have respective duty cycles during normal operation as controlled by the feedback control circuit (not shown). As further described below, the ADJ signal, when asserted, reduces the otherwise normal duty cycle of PWM1 whereas the ADJ increases the otherwise normal duty cycle of PWM2.

Figure 2:
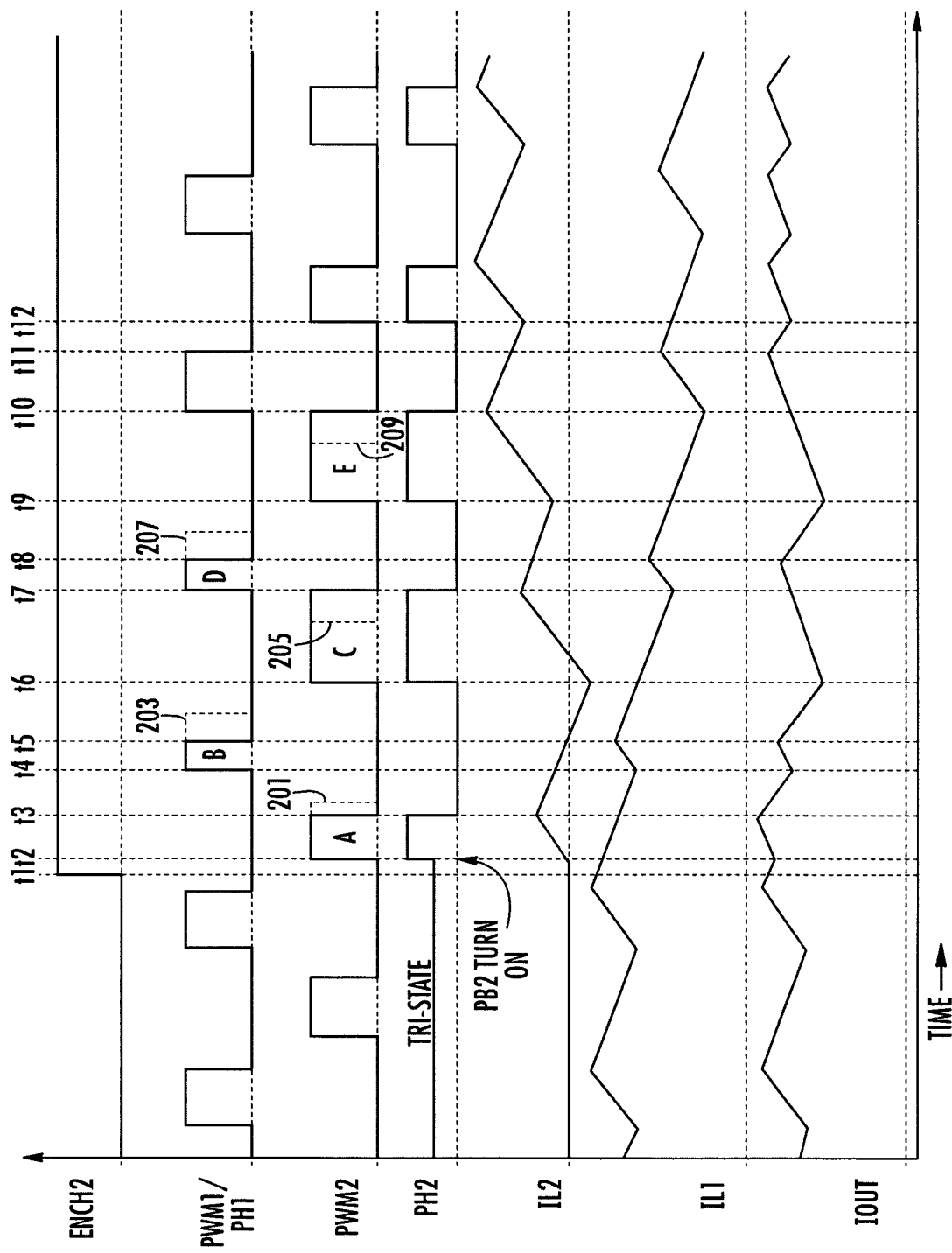
FIG. 2 is a timing diagram illustrating operation of the multiphase DC/DC converter of FIG. 1.

FIG. 2 is a timing diagram illustrating operation of the multiphase DC/DC converter 100. The signals ENCH2, PWM1/PH1, PWM2, PH2, IL2, IL1 and IOUT signals are plotted versus time. The respective zero reference for each plot is shown as a horizontal dotted line. The PWM1 and PH1 signals are shown as the same signal PWM1/PH1, where it is understood that these are two different signals which have a substantially similar waveform. Initially prior to a time t1, the PWM1 generator 101 and the PWM2 generator 103 are operating as normal and outputting PWM pulses with roughly equivalent duty cycles. The PWM1 and PWM2 pulses are alternated or toggled with respect to each other as understood by those of ordinary skill in the art. The ENCH2 signal is initially low, however, so that the second channel is disabled and the output of the channel 2 buffer PB2 is tri-stated. Thus, the PH2 signal is initially tri-stated and the inductor current IL2 is zero. The first channel remains enabled so that the pulses on PH1 are power-amplified versions of the PWM1 pulses. The first channel initially carries all the output current so that the IOUT current is the same as the IL1 current.

At the time t1, the ENCH2 signal is asserted high to enable the second channel to switch to a higher power mode. The counter 109 detects the rising edge of the ENCH2 signal and enables the amplifier A1. The counter 109 then monitors the PWM2 cycles and shuts off the amplifier A1 at the correct time. In the configuration illustrated, the counter 109, after enabling A1 in response to the ENCH2 signal going high, counts a predetermined number of PWM2 cycles (PWM2 pulses) and then disables the amplifier A1. While enabled, the amplifier A1 senses the output current IOUT and provides the ADJ signal indicative of the sensed output current to the PWM1 and PWM2 generators 101, 103. In an alternative embodiment (not shown), the amplifier A1 may be configured to sense the load current ILOAD. Either configuration for sensing IOUT or ILOAD is appropriate although sensing ILOAD may present practical problems. The current sensing method employed by the amplifier A1 is according to any one of various schemes well known to those skilled in the art.

The ADJ signal causes the PWM1 generator 101 to temporarily reduce the duty cycle of the PWM1 and PH1 signals as compared to the duty cycle during normal power operation. After the second channel is enabled, the ADJ signal causes the PWM2 generator to temporarily increase the duty cycle of the PWM2 and PH2 signals except for the first PWM2 pulse as further described below. The relative amount of pulse duty cycle adjustment for both phases is based on the ADJ signal, which in turn is based on the sensed current (IOUT or ILOAD).

The synchronization logic 107 detects the ENCH2 signal going high and enables the buffer PB2 to change from tri-state to high at the appropriate time. As shown, a pulse "A" is initiated on the PWM2 signal at a time t2 after the second channel is enabled, and the PH2 signal goes from tri-state to high at time t2. The synchronization logic 107 does not immediately enable the buffer PB2 at time t1, but instead turns it on synchronized with the initial PWM2 pulse, or pulse A. And since the PH2 signal is initially tri-stated rather than being fully off or at a low voltage level, the synchronization logic 107 adjusts activation of the PH2 pulse from the tri-state condition. In one embodiment, the PH2 is turned on when the PWM2 pulse A reaches a high logic level.

At a subsequent time t3, the pulse A on the PWM2 signal and the corresponding pulse on the PH2 signal are terminated. In the timing diagram, the change in duty cycle from "normal" operation is illustrated using solid lines as actual waveforms and dashed lines as normal-sized pulses during the transition from one-phase operation to two-phase operation. In this case, "normal" refers to normal operation in which the first and second phases are both enabled and sharing the load with substantially equal and alternating pulses. For pulse A, the dashed line shown at 201 illustrates the otherwise normal PWM2 pulse so that the actual pulse A on the PWM2 signal is shorter than normal. As described below, the first pulse A would otherwise be greater than normal in response to the ADJ signal but is terminated at one-half this increased size. The first PWM2 pulse upon activation of the second channel is shorter than its normal size so that the output current IOUT is approximately the same at the beginning and end of the phase adding procedure. At subsequent time t4, the next pulse on the PWM1 and PH1 signals, shown as a pulse B, is initiated. The B pulse terminates early at a time t5 before the normal PWM1 pulse as illustrated with dashed lines shown at 203. Pulse B on PWM1 is about half of its normal width as a consequence of the ADJ signal. The adjustment is typically smaller but one-half is used for purposes of clarity of illustration. The next pulse on the PWM2 and PH2 signals, shown as pulse C, is initiated at subsequent time t6 and terminates at a time t7. Pulse C on PWM2/PH2 is significantly larger than its normal width, as illustrated by dashed lines 205, as a consequence of the ADJ signal.

In the illustrated case, the next pulse on the PWM1/PH1 signals, shown as pulse D, is initiated at about the same time t7 as the termination of pulse C. Pulse D terminates early at time t8 and is about half its normal size shown at 207. The next pulse on the PWM2 and PH2 signals, shown as pulse E, is initiated at subsequent time t9 and terminates at a time t10 and again is larger than its normal width shown at 209. And the next pulse on the PWM1/PH1 signals is initiated at about the same time t10 as the termination of pulse E. In the illustrated example, the pulses C and E on the PWM2/PH2 signals are large and end at about the same time as the next pulses begin on the PWM1/PH1 signals. In the typical case, the pulses C and E are larger than normal yet typically end before the next pulses on the PWM1/PH1 signals. In the illustrated embodiment, the reduction from normal width of pulse B is approximately equal to the increase from normal width of the pulse C, and the reduction from normal width of pulse D is approximately equal to the increase from normal width of the pulse E. And the width of pulse A is approximately half that of pulse C on the PWM2/PH2 signals.

The gain of the amplifier A1 determines the relative adjustment of the pulses during activation of the second phase. The gain of the amplifier A1 depends on the method of PWM generation, the number of cycles that the designer chooses for changing the circuits, and the ratio of switching frequency to inductor size. The ratio tends to not vary much because when a small inductor is used, the frequency is increased to keep the current ripple constant in the output inductor. In the illustrated embodiment, two cycles of phase 1 were chosen to complete the transition so that two pulses of the PWM1/PH1 signals are altered (pulses B and D). The counter 109, in this case, is set to a count value of three falling edges of the PWM2 signal, so that the amplifier A1 is turned off at about time t10. Once the amplifier A1 is disabled, the PWM1/PWM2 signals return to their usual duty cycles. The pulse initiated on the PWM1/PH1 signals at time t10 is back to normal size and terminates as usual for two-phase operation at time t11. The next pulse on the PWM2/PH2 signals begins at subsequent time t12 as usual for two-phase operation, and thereafter normal two-phase operation continues.

Prior to time t2, the IL2 current is zero since the buffer PB2 is disabled. The IL1 current increases (positive slope) when the PWM1 and PH1 signals pulse high and decreases (negative slope) when the PWM1 and PH1 signals are low. The IOUT current is the same as the IL1 current while the second phase circuit is inactive. After time t2 when the buffer PB2 is enabled, the IL2 current increases (positive slope) when the PWM2 and PH2 signals pulse high and decreases (negative slope) when the PWM2 and PH2 signals are low. The output current IOUT is the sum of the IL1 and IL2 currents.

Figure 3:
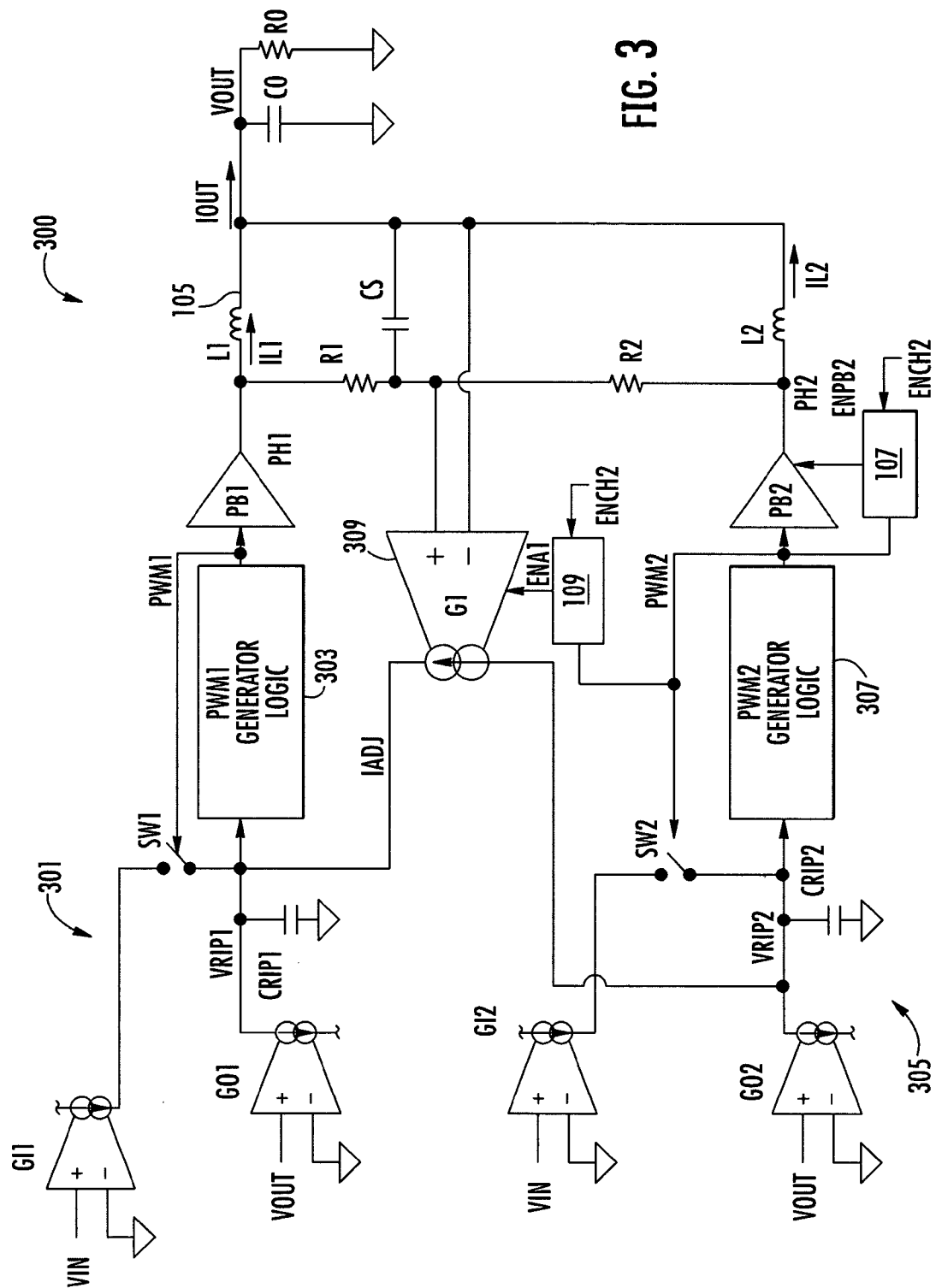
FIG. 3 is a schematic and block diagram of a multiphase DC/DC synthetic ripple regulator including a phase activation control system implemented according to an exemplary embodiment of the present invention.

FIG. 3 is a schematic and block diagram of a multiphase DC/DC synthetic ripple regulator 300 including a phase activation control system implemented according to an exemplary embodiment of the present invention. The principles of multiphase synthetic ripple regulation are described in a prior-filed application entitled "SYNCHRONIZATION OF MULTIPHASE SYNTHETIC RIPPLE VOLTAGE REGULATOR", issued Jul. 6, 2005 as U.S. Pat. No. 6,922,044, which has at least one common inventor, is commonly assigned, and is incorporated herein by reference in its entirety. The regulator 300 includes similar components as those of the converter 100, where similar components are shown with identical reference numbers. The buffers PB1, PB2, the output inductors L1, L2, the capacitor C0, the load R0, the counter 109 and the synchronization logic 107 are included and operate in a similar manner as previously described. The amplifier A1 is implemented to include a transconductance amplifier (G1) 309 having a non-inverting input (+) coupled to one end of a resistor R1, to one end of a capacitor CS and to one end of a resistor R2, and having an inverting input (−) coupled to the output node 105. The output of the amplifier 309 provides an adjust current IADJ. The other end of R1 is coupled to the output of the buffer PB1 and the other end of R2 is coupled to the output of the buffer PB2. The other end of the capacitor CS is coupled to node 105. The resistance-capacitance circuit including the resistors R1 and R2 and the capacitor CS converts current through the output inductors L1 and L2 into a corresponding sense voltage at the input of the amplifier 309, which converts the sense voltage to the adjust current IADJ.

The PWM1 generator 101 is replaced with a PWM1 generator 301 and the PWM2 generator 103 is replaced with a PWM2 generator 305. The PWM1 generator 301 includes transconductance amplifiers GI1 and GO1, a ripple capacitor CRIP1, a switch SW1 and PWM1 generator logic 303. The PWM2 generator 305 includes transconductance amplifiers GI2 and GO2, a ripple capacitor CRIP2, a switch SW2 and PWM2 generator logic 307. The switches SW1 and SW2 are each shown as a single-pole, single-throw (SPST) switch having a control input. The control input of SW1 receives the PWM1 signal and the control input of SW2 receives the PWM2 signal. The amplifiers GI1 and GI2 each have a non-inverting input receiving an input voltage VIN, an inverting input coupled to ground, and operate to supply a current proportional to or otherwise based on the voltage level of VIN. The amplifiers GO1 and GO2 each have a non-inverting input receiving the output voltage VOUT, an inverting input coupled to ground, and operate to supply a current proportional to or otherwise based on the voltage level of VOUT. In the illustrated embodiment, VIN is greater than VOUT for buck-type DC/DC regulator operation.

The output of the amplifier GO1 is coupled to one end of the capacitor CRIP1, to one terminal of the switch SW1, to an input of the PWM1 generator logic 303 and to a current output of the amplifier 309 for receiving the IADJ current when the amplifier 309 is enabled. The current output of the amplifier GI1 is coupled to the other terminal of the switch SW1. In a similar manner, the output of the amplifier GO2 is coupled to one end of the capacitor CRIP2, to one terminal of the switch SW2, to an input of the PWM2 generator logic 307 and to a current input of the amplifier 309 for supplying the adjust current IADJ when amplifier 309 is enabled. The current output of the amplifier GI2 is coupled to the other terminal of the switch SW2.

During normal operation while the amplifier 309 is disabled, the switch SW1 is opened when the PWM1 signal is low and is closed when the PWM1 signal is high. The amplifier GO1 pulls a current proportional to or otherwise based on VOUT from CRIP1, which causes the voltage level on the capacitor CRIP1 to ramp down when switch SW1 is opened, which is when the PWM1 signal is low. When the voltage of the capacitor CRIP1 reaches a low level, the PWM1 generator logic 303 asserts the PWM1 signal high, which closes the switch SW1*. When the switch SW1 is closed, the amplifier GI1 supplies a current based on or otherwise proportional to VIN to the capacitor CRIP1. Since VIN is greater than VOUT, the voltage on CRIP1 ramps up while SW1 is closed having a positive slope based on the difference between the VIN and VOUT voltages. When the voltage of CRIP1 reaches a high level, the PWM1 generator logic 303 asserts the PWM1 signal low re-opening the switch SW1. Thus, a "synthetic" ripple voltage develops on CRIP1 to control PWM1, and operation repeats in this manner.

Similarly during normal operation while the amplifier 309 is disabled, the switch SW2 is opened when the PWM2 signal is low and is closed when the PWM2 signal is high. The amplifier GO2 pulls a current proportional to or otherwise based on. VOUT from CRIP2, which causes the voltage level on the capacitor CRIP2 to ramp down when the switch SW2 is opened, which is when the PWM2 signal is low. When the voltage of the capacitor CRIP2 reaches a low level, the PWM2 generator logic 307 asserts the PWM2 signal high, which closes the switch SW2. When the switch SW2 is closed, the amplifier GI2 supplies a current based on or otherwise proportional to VIN to the capacitor CRIP2. Since VIN is greater than VOUT, the voltage on CRIP2 ramps up while SW2 is closed. When the voltage of CRIP2 reaches a high level, the PWM2 generator logic 307 asserts the PWM2 signal low re-opening the switch SW2. Thus, "synthetic" ripple voltages develop on the ripple capacitor CRIP2 to control PWM2, and operation repeats in this manner.

Although not shown, separate control logic develops a master ripple signal and alternates or toggles between the PWM1 and PWM2 generators 301, 303 for synthetic ripple regulator operation. When the buffer PB2 is disabled for one-phase operation, however, then PH2 is tri-stated and does not contribute to the output load as previously described. During one-phase operation, only the buffer PB1 is enabled to amplify the PWM1 signal to contribute to the output current and IL2 is zero.

When the amplifier 309 is enabled to transition from one-phase to two-phase operation, it senses the output current IOUT via the average voltage across the output inductors L1 and L2 and converts the sensed average voltage to the IADJ current, which is pulled from CRIP2 and added to CRIP1. Recall that the PWM2 generator logic 307 switches to assert the PWM2 signal high in response to a low voltage on the capacitor CRIP2, so that the switch SW2 is closed allowing the current from the amplifier GI2 to charge CRIP2. Since the current from amplifier GI2 provided to the capacitor CRIP2 is greater than the current of GO2 pulled from capacitor CRIP2, the net current charges CRIP2 so that its voltage rises. The PWM2 signal is high until the voltage on the capacitor CRIP2 reaches a high level. The slope of the ramp of net current provided to the capacitor CRIP2 determines the duty cycle of PWM2, which is modified by the IADJ current. The IADJ current pulls current from the capacitor CRIP2 thereby reducing net current and reducing the slope of the ramp, so that it takes longer to reach a high voltage level. Consequently, the width of the PWM2 signal is increased as illustrated by pulses C and E being longer than usual. A similar yet opposite effect occurs for the PWM1 generator 301, where the added IADJ current increases the net current provided to the capacitor CRIP1 so that the slope of the rising voltage ramp is greater, which causes the PWM1 pulses to be shortened, as illustrated by pulses B and D.

Recall that the first pulse of the PWM2 signal is half the size of the next pulse C in response to the IADJ signal (and less than the normal pulse even though it would otherwise be larger than the normal pulse). This is achieved in one of several ways, such as, for example, by doubling the pull-up current, or by halving the pull-down current during the previous cycle, or by delaying the down slope of the previous cycle until the PWM1 signal fires. In the configuration illustrated, the last method of delaying the down slope of the previous cycle until the PWM1 signal fires was selected. Other options are available and contemplated.

The result of employing a phase activation control system implemented according to an embodiment of the present invention is that the duty cycle of the phase(s) that are turning on is increased proportional to the output (or load) current, and the duty cycle of the phase(s) that are already on is decreased proportional to the output (or load) current. The total output current of all the phases, including the phase(s) that are turning on, remains relatively constant. Thus, the output voltage does not rise but instead remains relatively stable while the currents are adjusted. The output voltage may exhibit a disturbance during the transition, but such disturbance is substantially smaller than the conventional design in which the output voltage rises by a significant amount. The alteration of duty cycle is done for the correct number of PWM cycles needed to properly change the current of each phase. Also, the currents end up balanced without using the slow current balance loop. The gain of the amplifier A1 or G1 determines how quickly the circuit transitions while activating the previously disabled phase circuit. It is desired to set the gain sufficiently high to make the transition as fast as possible without significantly changing VOUT. Once the timing is determined for a particular configuration, the counter 109 is programmed for the corresponding number of PWM cycles to complete the transition.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A phase activation control system for a multiphase DC/DC converter, the multiphase DC/DC converter including a first phase circuit providing a first pulse width modulation (PWM) signal and having a reduce input for reducing duty cycle of the first PWM signal and including a second phase circuit providing a second PWM signal and having an enable input and an increase input for increasing duty cycle of the second PWM signal, said phase activation control system comprising:
   an amplifier circuit having an enable input, a current sense input for sensing output current of the multiphase DC/DC converter and an output providing an adjust signal;
   wherein said adjust signal is provided to the reduce input of the first phase circuit and to the increase input of the second phase circuit; and
   enable logic having an input receiving a phase enable signal, a first output coupled to said enable input of said amplifier circuit, and a second output for coupling to the enable input of the second phase circuit.

2. The phase activation control system of claim 1, wherein said enable logic comprises:
   a counter having a first input receiving said phase enable signal, a second input for receiving the second PWM signal, and an output provided to said enable input of said amplifier circuit; and
   wherein said counter enables said amplifier circuit for a predetermined number of cycles of the second PWM signal after receiving said phase enable signal.

3. The phase activation control system of claim 1, wherein said enable logic comprises:
   synchronization logic having a first input receiving said phase enable signal, a second input for receiving the second PWM signal, and an output provided to the enable input of the second phase circuit; and
   wherein said synchronization logic enables the second phase circuit from a tri-state condition after receiving said phase enable signal.

4. The phase activation control system of claim 1, wherein the reduce input and the increase input are capacitive nodes, and wherein said adjust signal comprises a current signal.

5. The phase activation control system of claim 4, wherein the first and second phase circuits comprise inductive outputs, and wherein said amplifier circuit comprises:
   a resistive-capacitive circuit that senses current through the inductive outputs and converts into a corresponding sense voltage; and a transconductance amplifier having an input coupled to said resistive-capacitive circuit and an output providing said adjust signal.

6. A multiphase DC/DC converter, comprising:
a first pulse width modulation (PWM) generator which provides a first PWM signal having a duty cycle that is reduced by an adjust signal;
a second PWM generator which provides a second PWM signal having a duty cycle that is increased by said adjust signal;
a first buffer which receives said first PWM signal and which provides a corresponding first phase signal to a first output inductor;
a second buffer which receives said second PWM signal and which provides a corresponding second phase signal to a second output inductor, said second buffer having an enable input;
said first and second output inductors coupled together at an output node;
synchronization logic which receives a channel enable signal and said second PWM signal and which provides an enable signal to said enable input of said second buffer; and
an amplifier circuit which senses output current and which provides said adjust signal indicative thereof in response to said channel enable signal.

7. The multiphase DC/DC converter of claim 6, wherein said amplifier circuit is enabled for a predetermined number of cycles after said channel enable signal is provided.

8. The multiphase DC/DC converter of claim 7, wherein said amplifier circuit comprises a counter that counts said predetermined number of cycles of said second PWM signal.

9. The multiphase DC/DC converter of claim 6, wherein said amplifier circuit comprises:
a resistive-capacitive circuit coupled to said first and second output inductors that senses average current through said first and second output inductors and that converts said average current to a sense voltage; and
a transconductance amplifier having an input coupled to said resistive-capacitive circuit and an output providing said adjust signal as a current signal.

10. The multiphase DC/DC converter of claim 9, wherein said first and second PWM generators each comprise a transconductance circuit and a ripple capacitor and wherein said transconductance amplifier provides said adjust signal to adjust charging current of each said ripple capacitor.

11. The multiphase DC/DC converter of claim 6, wherein said synchronization logic enables said second buffer synchronous with said second PWM signal.

12. The multiphase DC/DC converter of claim 6, wherein said synchronization logic enables said second buffer when second PWM signal is high.

13. A method of activating a phase in a multiphase DC/DC converter having a first phase circuit providing a first pulse width modulation (PWM) signal and a second phase circuit providing a second PWM signal and that is selectively enabled, comprising:
receiving a phase enable signal and enabling operation of the second phase circuit;
sensing output current of the multiphase DC/DC converter;
converting sensed output current to an adjust signal; and
reducing duty cycle of the first PWM signal while increasing duty cycle of the second PWM signal based on the adjust signal.

14. The method of claim 13, the multiphase DC/DC converter including a buffer which converts the second PWM signal to a second phase signal, wherein said enabling operation of the second phase circuit comprises enabling the buffer.

15. The method of claim 14, the buffer being in a tri-state condition when disabled, wherein said enabling operation of the second phase circuit comprises synchronizing activation of the second phase signal with the second PWM signal.

16. The method of claim 13, further comprising:
counting cycles of the second phase upon receiving the phase enable signal; and
wherein said reducing duty cycle of a first phase while increasing duty cycle of a second phase occurs for a predetermined number of cycles of the second phase.

17. The method of claim 13, wherein said sensing output current comprises detecting an average current through output inductors of the first and second phases and converting average current to a sense voltage.

18. The method of claim 17, wherein said converting sensed output current to an adjust signal comprises converting the sense voltage to an adjust current.

19. The method of claim 18, further comprising:
alternately charging and discharging, by each of the first and second phases, a corresponding one of first and second ripple capacitors; and
increasing charging of the first ripple capacitor and decreasing charging of the second ripple capacitor based on the adjust current.

20. The method of claim 19, the multiphase DC/DC converter converting an input voltage to a smaller output voltage, wherein said alternately charging and discharging comprises:
continuously discharging the first and second ripple capacitors based on the output voltage; and
charging the first and second ripple capacitors based on the input voltage while a corresponding PWM signal is high.

* * * * *